United States Patent Office 3,850,915
Patented Nov. 26, 1974

3,850,915
2,6-DICHLOROBENZALDEHYDE HYDRAZONES
William F. Bruce, Havertown, Pa., assignor to American Home Products Corporation, New York, N.Y.
No Drawing. Original application Sept. 3, 1971, Ser. No. 177,883, now Patent No. 3,775,405, dated Nov. 27, 1973. Divided and this application May 7, 1973, Ser. No. 358,235
Int. Cl. C09b 23/00
U.S. Cl. 260—240 G        5 Claims

ABSTRACT OF THE DISCLOSURE

Hydrazones of 2,6-dichlorobenzaldehyde exhibiting central nervous system depressant activity.

---

This is a division of application Ser. No. 177,883, filed Sept. 3, 1971, now U.S. Pat. No. 3,775,405, granted Nov. 27, 1973.

BRIEF DESCRIPTION OF THE INVENTION

In accordance with this invention there is provided a group of hydrazone derivatives of 2,6-dichlorobenzaldehyde. More specifically, this invention provides a series of N-(2,6-dichlorobenzylideneamino)-substituted amines selected from the group consisting of pyridylamine, triazole, triazolamine and aniline derivatives in which any additional nuclear substituent is selected from the group consisting of —OH, —NO$_2$, —Cl, —F, amino, lower alkyl and lower alkylsulfonyl.

Thus, the compounds of this invention may be represented by the formula:

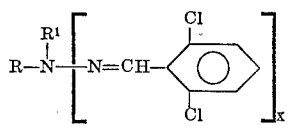

in which R is selected from the group consisting of pyridyl, nitropyridyl, nitrophenyl, dinitrophenyl, chlorophenyl, fluorophenyl, lower alkylsulfonylphenyl, hydroxylower alkylpyrimidyl,

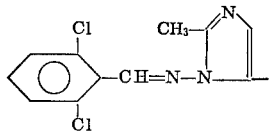

and

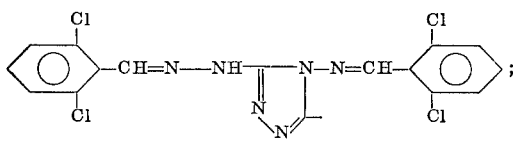

R$^1$ is —H, and when taken with R, forms the N-bicarbamimidyl radical; and X is an integer from 1 to 3.

The compounds of the invention are prepared by heating 2,6-dichlorobenzaldehyde and the appropriate hydrazino compound in the presence of an organic solvent.

The compounds of this invention have been found to exert a depressant action on the central nervous system when tested under standard and accepted pharmacological procedures, in animals, such as mice and rats. They are, therefore, deemed to possess utility in experimental and comparative pharmacology and are of value to treat conditions in animals, such as valuable domestic animals, and in laboratory animals, such as mice, rats and the like, responsive to treatment with central nervous system depressant agents. Specifically the compounds may be employed to induce a calming effect in mammals.

In the pharmacological evaluation of the biological activity of the compounds of this invention, the in vivo effects were tested as follows: The compound was administered orally to three mice (14 to 24 grams weight each) at each of the following doses: 400, 127, 40 and 12.7 milligrams per kilogram of host body weight (MPK). The animals were watched for a minium of two hours during which time signs of general stimulation, (i.e. increased spontaneous motor activity, hyperactivity on tactile stimulation, twitching) general depression (i.e., decreased spontaneous motor activity, decreased respiration) were noted.

The compounds of this invention induce central nervous system depressant effects at a dose of about 40 to about 400 MPK.

The following examples illustrate specific compounds within the scope of the invention, but the invention is not to be construed as limited thereto.

EXAMPLE I 2,6-Dichlorobenzaldehyde 5-nitro-2-pyridylhydrazone

A solution of 3.5 g. of 2-hydrazino-5-nitropyridine, m.p. 218–9°, in 50 ml. of ethanol and 15 ml. of acetic acid, heated 20 minutes on a steam bath, was combined with a hot solution of 3.5 g. of 2,6-dichlorobenzaldehyde in 30 ml. of ethanol to give at once a bright yellow precipitate, m.p. 298–9° d.

Analysis.—Calc'd for $C_{12}H_8Cl_2N_4O_2$: C, 46.32; H, 2.59; N, 18.01. Found: C, 45.91; H, 2.52; N, 17.91.

EXAMPLE II 2,6-Dichlorobenzaldehyde [4-(2,6-dichlorobenzylideneamino)-5-methyl-4H-1,2,4-triazol-3-yl]hydrazone A solution of 3.5 g. of 3-hydrazino-4-N-amino-5-methyltriazole hydrochloride in 25 ml. of water and 5 ml. of 6 N hydrochloric acid, with 7 g. of 2,6-dichlorobenzaldehyde in 25 ml. of ethanol, heated 1 hour on a steam bath, gave 6 g. of fibrous bright yellow crystals, m.p. 219–20°.

Analysis.—Calc'd for $C_{17}H_{12}Cl_4N_6$: C, 46.28; H, 2.51; Cl, 32.15; N, 19.05. Found: C, 46.20; H, 2.64; Cl, 32.19; N, 18.42.

EXAMPLE III 2,6-Dichlorobenzaldehyde 2,4-dinitrophenylhydrazone

A solution of 5 g. of 2,4-dinitrophenylhydrazine suspended in 50 ml. of ethanol and 4.5 g. of 2,6-dichlorobenzaldehyde in 60 ml. of ethanol heated nearly to boiling on a steam bath, when 2 ml. of concentrated hydrochloric acid was added, gave after 2 hours on a steam bath 8.5 g. of orange platelets, m.p. 260–1°.

Analysis.—Calc'd for $C_{13}H_8Cl_2N_4O_4$: C, 43.96; H, 2.27; Cl, 19.97; N, 15.78. Found: C, 43.69; H, 2.40; Cl, 19.87; N, 15.82.

EXAMPLE IV 2,6-Dichlorobenzaldehyde p-nitrophenylhydrazone

A solution of 4 g. of p-nitrophenylhydrazine in 30 ml. of ethanol with 4 g. of 2,6-dichlorobenzaldehyde in 30 ml. of ethanol, heated 1 hour on a steam bath gave 5 g. of yellow fibrous crystals, m.p. 231–2° after crystallization from dimethylformamide and ethanol.

Analysis.—Calc'd for $C_{13}H_9Cl_2N_3O_2$: C, 50.34; H, 2.93; Cl, 22.86; N, 13.55. Found: C, 50.08; H, 3.00; Cl. 22.99; N, 13.72.

EXAMPLE V

2,6-Dichlorobenzaldehyde p-fluorophenylhydrazone

A solution of 10 g. of p-fluorophenylhydrazine hydrochloride suspended in 50 ml. of water with 10 ml. of 10% sodium hydroxide was extracted with ether, and the ethereal solution was mixed with a solution of 5 g. of 2,6-dichlorobenzaldehyde in 30 ml. of ethanol and 2 ml. of acetic acid was heated 1 hour on a steam bath, then acidified to pH 1 with 0.1 N hydrochloric acid to give 7 g. of flaky tan crystals, m.p. 92–3°.

*Analysis.*—Calc'd for $C_{13}H_9Cl_2FN_2$: C, 55.14; H, 3.20; Cl, 25.04; N, 9.90. Found: C, 55.15; H, 3.25; Cl, 24.90; N, 9.95.

EXAMPLE VI

2,6-Dichlorobenzaldehyde-m-nitrophenylhydrazone

A solution of 5.5 g. of 3-nitrophenylhydrazine in 50 ml. of ethanol, with a solution of 4.5 g. of 2,6-dichlorobenzaldehyde in 30 ml. of ethanol, with 5 g. of sodium acetate in 20 ml. of water, heated 10 minutes on a steam bath, gave 7.5 g. of orange needles, m.p. 209–10°.

*Analysis.*—Calc'd for $C_{13}H_9Cl_2N_3O_2$: C, 47.58; H, 3.38; N, 12.80. Found: C, 47.42; H, 3.13; N, 12.56.

EXAMPLE VII

2,6-Dichlorobenzaldehyde p-chlorophenylhydrazone

A solution of 4.5 g. of 4-chlorophenylhydrazine hydrochloride in 20 ml. of hot water with a hot solution of 5 g. of 2,6-dichlorobenzaldehyde in 20 ml. of ethanol gave 6 g. of pale yellow fluffy needles, m.p. 125–6°.

*Analysis.*—Calc'd for $C_{13}H_9Cl_3N_2$: C, 52.12; H, 3.03; Cl, 35.51; N, 9.35. Found: C, 52.04; H, 3.01; Cl, 35.29; N, 9.41.

EXAMPLE VIII

2,6-Dichlorobenzaldehyde (4-hydroxy-6-methyl-2-pyrimidinyl)hydrazone

A suspension of 3 g. of 2-hydrazino-4-hydroxy-6-methyl-pyrimidine in 60 ml. of ethanol and 10 ml. of acetic acid heated on a steam bath gave a solution on addition of 4 g. of 2,6-dichlorobenzaldehyde. This on filtration gave 6 g. of white flocculent solid, m.p. 233°, turning bright yellow at 170–5°.

*Analysis.*—Calc'd for $C_{12}H_{10}Cl_2N_4O$: C, 48.50; H, 3.39; Cl, 23.86; N, 18.86. Found: C, 48.39; H, 3.44; Cl, 24.00; N, 18.91.

EXAMPLE IX

N-(2,6-Dichlorobenzylideneamino)bicarbamimide

A solution of 4 g. of bicarbamimide in 20 ml. of ethanol and 60 ml. of water, heated on a steam bath, with 6 g. of 2,6-dichlorobenzaldehyde in 40 ml. of ethanol heated 10 minutes on a steam bath gave 5 g. of white pasty precipitate which was filtered and washed with water and ethanol to melt at 201–2° d.

*Analysis.*—Calc'd for $C_9H_9Cl_2N_5O_2$: C, 37.26; H, 3.13; Cl, 24.23; N, 24.14. Found: C, 37.61; H, 3.16; Cl, 24.44; N, 23.59.

EXAMPLE X

4-(2,6-Dichlorobenzylideneamino)-3,5-bis(2,6-dichlorobenzylidenehydrazino)-4H-1,2,4-triazole A solution of 1.5 g. of 4-amino-3,5-dihydrazino-4H-1,2,4-triazole in 10 ml. of water, with 3 g. of 2,6-dichlorobenzaldehyde in 20 ml. of ethanol gave after 2 hours on a steam bath a clear yellow solution. On standing in a crystallizing dish this gave 2 g. of yellow crystals, m.p. 147–9°.

*Analysis.*—Calc'd for $C_{23}H_{14}Cl_6N_8$: C, 44.90; H, 2.29; Cl, 34.58; N, 18.22. Found: C, 44.96; H, 2.65; Cl, 34.55; N, 18.55.

EXAMPLE XI

2,6-Dichlorobenzaldehyde p-methylsulfonylphenylhydrazone

A solution of 4.5 g. of 4-methylsulfonylphenylhydrazine in 40 ml. of 90% ethanol, with 5 g. of 2,6-dichlorobenzaldehyde in 30 ml. of ethanol, heated 30 minutes on a steam bath, gave 6.5 g. of granular pale yellow crystals, m.p. 209–10°.

*Analysis.*—Calc'd for $C_{14}H_{12}Cl_2N_2O_2S$: C, 48.96; H, 3.56; Cl, 20.67; N, 8.16; S, 9.34. Found: C, 48.59; H, 3.53; Cl, 20.50; N, 8.27; S, 9.61.

EXAMPLE XII

2,6-Dichlorobenzaldehyde (2-pyridyl)hydrazone

A solution of 5 g. of 2-hydrazinopyridine in 8 ml. of warm ethanol was added to 8 g. of 2,6-dichlorobenzaldehyde in 30 ml. of ethanol to give 7 g. of yellowish-white fluffy needles, m.p. 183–4°, after softening and rehardening at 174°.

*Analysis.*—Calc'd for $C_{12}H_9Cl_2N_3$: C, 54.16; H, 3.41; Cl, 26.65; N, 15.79. Found: C, 54.29; H, 3.49; Cl, 26.52; N, 16.08.

What is claimed is:

1. A compound selected from the group consisting of 2,6-dichlorobenzaldehyde [4 - (2,6 - dichlorobenzylideneamino)-5-methyl-4H-1,2,4-triazol-3-yl]hydrazone, 2,6-dichlorobenzaldehyde (4-hydroxy-6-methyl-2-pyrimidinyl)-hydrazone, N-(2,6 - dichlorobenzylideneamino)bicarbamimide, and 4-(2,6-dichlorobenzylideneamino)-3,5-bis-(2,6-dichlorobenzylidenehydrazino)-4H-1,2,4-triazole.

2. A compound of Claim 1 of the formula:

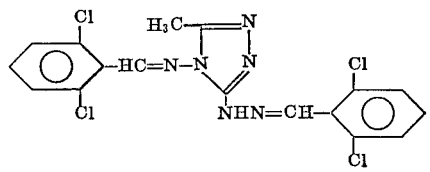

3. A compound of Claim 1 of the formula:

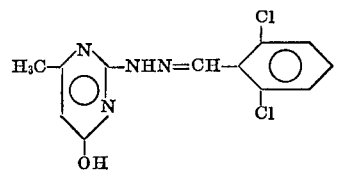

4. A compound of Claim 1 of the formula:

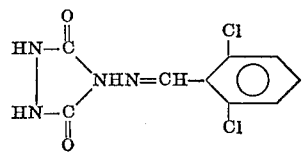

5. A compound of Claim 1 of the formula:

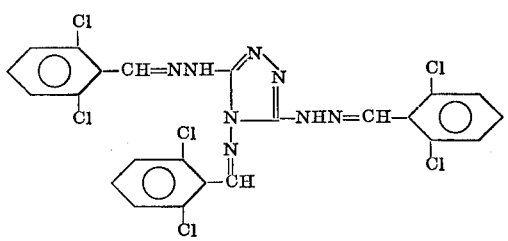

(References on following page)

References Cited

UNITED STATES PATENTS

| | | | |
|---|---|---|---|
| 3,516,995 | 6/1970 | Houlihan et al. | 260—240 G |
| 3,528,969 | 9/1970 | Houlihan et al. | 260—240 G |
| 3,573,287 | 3/1971 | Schorr et al. | 260—240 G |
| 3,775,405 | 11/1973 | Bruce | 260—240 G |

FOREIGN PATENTS

| | | | |
|---|---|---|---|
| 1,019,120 | 2/1966 | England | 260—240 G |
| 1,572,620 | 5/1969 | France | 260—240 G |

OTHER REFERENCES

Yoneda et al.: Tetrahedron Letters, No. 13, pp. 851–854 (1971).

Hegarty et al.: J. Chem. Soc. (B), *1966*, pages 1031 to 1034.

JOHN D. RANDOLPH, Primary Examiner

U.S. Cl. X.R.

260—566 B; 424—251, 263, 269, 327